US012800849B2

(12) United States Patent
Ohmori et al.

(10) Patent No.: US 12,800,849 B2
(45) Date of Patent: Nov. 17, 2026

(54) MANUFACTURING METHOD FOR OPTICAL CONNECTOR

(71) Applicants: Fujikura Ltd., Tokyo (JP); Fujikura Automotive Asia Ltd., Yamagata (JP)

(72) Inventors: Kenichi Ohmori, Sakura (JP); Norihiro Ishikura, Sakura (JP); Mikhail Illarionov, Sakura (JP); Ryo Midorikawa, Sakura (JP); Daisuke Hayasaka, Yonezawa (JP); Atsushi Furugori, Yonezawa (JP)

(73) Assignee: Fujikura Ltd., Tokyo (JP)

( * ) Notice: Subject to any disclaimer, the term of this patent is extended or adjusted under 35 U.S.C. 154(b) by 113 days.

(21) Appl. No.: 18/552,058

(22) PCT Filed: Feb. 14, 2022

(86) PCT No.: PCT/JP2022/005770
§ 371 (c)(1),
(2) Date: Sep. 22, 2023

(87) PCT Pub. No.: WO2022/201965
PCT Pub. Date: Sep. 29, 2022

(65) Prior Publication Data

US 2024/0192451 A1 Jun. 13, 2024

(30) Foreign Application Priority Data

Mar. 26, 2021 (JP) ................................ 2021-053221

(51) Int. Cl.
*G02B 6/38* (2006.01)

(52) U.S. Cl.
CPC ......... *G02B 6/3885* (2013.01); *G02B 6/3871* (2013.01)

(58) Field of Classification Search
None
See application file for complete search history.

(56) References Cited

U.S. PATENT DOCUMENTS 6,712,526 B1 3/2004 Fleenor
7,431,514 B2 * 10/2008 Fujiwara .............. G02B 6/3885 385/71
9,366,828 B2 * 6/2016 Bradley ............... G02B 6/3843

(Continued)

OTHER PUBLICATIONS

International Search Report issued in corresponding International Application No. PCT/JP2022/005770 mailed Apr. 5, 2022 (2 pages).

(Continued)

*Primary Examiner* — Jerry Rahll
(74) *Attorney, Agent, or Firm* — Osha Bergman Watanabe & Burton LLP

(57) ABSTRACT

A manufacturing method for an optical connector includes inserting and fixing a multi-core fiber into a ferrule, wherein at least one of a plurality of cores of the multi-core fiber is a spiral core, inserting the ferrule into a housing and aligning the cores with the housing around a central axis of the multi-core fiber, obliquely polishing the ferrule while the housing rotates with respect to the central axis to have a rotational offset amount that compensates for positional misalignment of the cores expected due to the oblique polishing of the ferrule, and fixing the ferrule to the housing after the aligning of the cores.

6 Claims, 9 Drawing Sheets

(56) References Cited

U.S. PATENT DOCUMENTS

| | | | | |
|---|---|---|---|---|
| 9,568,685 | B2 * | 2/2017 | Bradley | G02B 6/3851 |
| 2006/0188208 | A1 | 8/2006 | Carberry | |
| 2006/0245695 | A1 * | 11/2006 | Fujiwara | G02B 6/3885 385/71 |
| 2013/0064509 | A1 * | 3/2013 | Byer | G02B 6/3818 385/72 |
| 2013/0142487 | A1 * | 6/2013 | Sasaoka | G02B 6/3822 385/60 |
| 2013/0299076 | A1 * | 11/2013 | Bradley | G02B 6/02042 156/434 |
| 2016/0252684 | A1 | 9/2016 | Bradley | |
| 2017/0168247 | A1 * | 6/2017 | Watanabe | G02B 6/3839 |
| 2018/0172920 | A1 * | 6/2018 | Froggatt | G02B 6/02042 |

OTHER PUBLICATIONS

English translation of International Search Report issued in corresponding International Application No. PCT/JP2022/006353, dated Apr. 5, 2022 (2 pages).

Office Action issued in U.S. Appl. No. 18/283,553, dated Dec. 2, 2025 (22 pages).

Office Action issued in U.S. Appl. No. 18/283,553, dated Apr. 21, 2026 (20 pages).

* cited by examiner

MANUFACTURING METHOD FOR OPTICAL CONNECTOR

CROSS-REFERENCE TO RELATED APPLICATIONS

The present application claims priority to Japanese Patent Application No. 2021-053221, filed Mar. 26, 2021. The contents of this (these) application(s) are incorporated herein by reference in their entirety.

BACKGROUND

Technical Field

The present invention relates to a manufacturing method for an optical connector.

Description of the Related Art

In recent years, a multi-core fiber in which at least one core among a plurality of cores is spirally formed has been developed. Such a multicore fiber is also called a spun multicore fiber. Such a spun multicore fiber is used in, for example, contact sensors, shape sensors, and medical applications.

In many cases, an optical connector is provided at a distal end of a spun multicore fiber in which an end surface of the ferrule (end surface of the spun multicore fiber) is obliquely polished by a predetermined angle (for example, 8°) in order to reduce reflection of the end surface. Such an optical connector is also called an angled physical contact (APC) connector. The spun multicore fiber has cores formed in a spiral shape. Therefore, when the end surface of the ferrule is obliquely polished in order to form the APC connector at the distal end of the spun multicore fiber, it is possible that the position of the core may become misaligned resulting in an increase in splice loss.

Patent Document 1 discloses a technology of suppressing the likelihood of an increase in connection loss by reducing positional misalignment of the core due to oblique polishing. Specifically, in the technology disclosed in Patent Document 1, after the spun multicore fiber is bonded to the ferrule, the ferrule is rotated by an amount that allows compensation for expected positional misalignment of the core due to oblique polishing to provide a rotational offset amount. After the rotational offset amount is provided, the end surface of the ferrule is obliquely polished, thereby reducing the likelihood of positional misalignment of the core due to oblique polishing.

PATENT DOCUMENT

Patent Document 1: U.S. Pat. No. 9,366,828

The technology disclosed in Patent Document 1 can reduce the positional misalignment of the core if there is no variation in a polished amount when the ferrule is obliquely polished. However, when there is a difference between a rotational offset amount expected in advance and an amount of the core positional misalignment due to actual polishing, the connection loss may increase.

SUMMARY

One or more embodiments provide a manufacturing method for an optical connector which can reduce connection loss over the related art.

A manufacturing method for an optical connector according to one or more embodiments includes: a first step S11 and S21 of inserting and fixing a multi-core fiber 10, in which at least one core among a plurality of cores 12 is spirally formed, into a ferrule 21; a second step S13 and S14 of inserting the ferrule into a housing 22 and performing positional alignment between the plurality of cores and the housing around a central axis of the multi-core fiber; a third step S15 of obliquely polishing the ferrule in a state where the housing is rotated around the central axis of the multi-core fiber such that a rotational offset amount which allows compensation for positional misalignment of the core expected due to oblique polishing of the ferrule; and a fourth step S16 of fixing the ferrule to the housing after performing positional alignment of the plurality of cores around the central axis of the multi-core fiber.

In the manufacturing method for an optical connector according to one or more embodiments, the multi-core fiber, in which at least one core among the plurality of cores is spirally formed, is inserted and fixed into the ferrule. Next, the ferrule is inserted into the housing, and positional alignment between the plurality of cores and the housing around a central axis of the multi-core fiber is performed. Subsequently, the ferrule is obliquely polished in a state where the housing is rotated around the central axis of the multi-core fiber such that a rotational offset amount which allows compensation for positional misalignment of the core expected due to oblique polishing of the ferrule. Then, the ferrule is fixed to the housing after performing the positional alignment of the plurality of cores around a central axis of the multi-core fiber. The positional alignment is performed after polishing, so that it is possible to accurately align the position that has been misaligned due to the polishing. Therefore, it is possible to reduce a connection loss over the related art.

In the manufacturing method for an optical connector according to one or more embodiments, the fourth step may be a step of performing positional alignment of the plurality of cores by rotating the ferrule around the central axis of the multi-core fiber by a certain angle.

Alternatively, in the manufacturing method for an optical connector according to one or more embodiments, the fourth step may be a step of performing positional alignment of the plurality of cores by aligning the positions of the plurality of cores.

The manufacturing method for an optical connector according to one or more embodiments may further include: a fifth step S12 of polishing the ferrule perpendicularly to the direction of the central axis of the multi-core fiber, between the first step and the second step.

Alternatively, in the manufacturing method for an optical connector according to one or more embodiments, the first step may be a step of fixing the multi-core fiber to the ferrule such that, in a state where positions of the plurality of cores around the central axis of the multi-core fiber having a polished end surface are aligned with respect to the ferrule, the end surface is flush with the end surface of the ferrule.

In the manufacturing method for an optical connector according to one or more embodiments, the third step may be a step of obliquely polishing the ferrule such that (i.e., until) a width $l$ of a reference surface PL0, which is an end surface of the ferrule perpendicular to a direction of the central axis of the multi-core fiber, is a predefined width.

The manufacturing method for an optical connector according to one or more embodiments, when the rotational offset amount is defined as $\varphi$, the rotational offset amount $\varphi$ may be expressed by the following Equation by using a spiral period fw of the multi-core fiber, a diameter d of the reference surface before oblique polishing, a width l of the reference surface, and an angle $\theta_{APC}$ at which the ferrule is obliquely polished.

Equation 1

$$\varphi = \frac{2\pi}{fw} \times \left(\frac{d}{2} - l\right) \times \tan\theta_{APC}$$

According to one or more embodiments, it is possible to reduce a connection loss over the related art.

DESCRIPTION OF THE EMBODIMENTS

Figure 1:
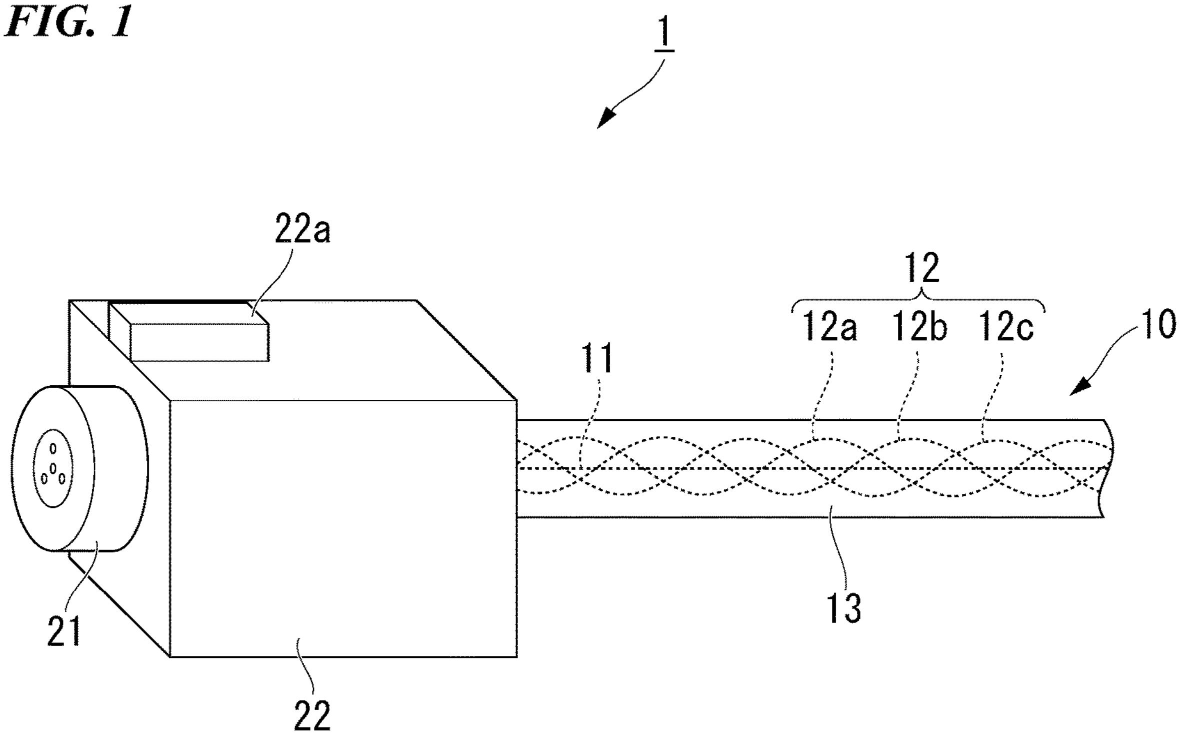
FIG. 1 is a perspective view showing a main configuration of an optical connector according to a first example.

Hereinafter, a manufacturing method for an optical connector according to embodiments will be described in detail with reference to the drawings. In the drawings to be referred to below, for the sake of easy understanding, the scale of dimension of each member may be appropriately changed if necessary.

First Example

<Optical Connector and Multi-Core Fiber>

FIG. 1 is a perspective view showing a main configuration of an optical connector according to a first example. As shown in FIG. 1, an optical connector 1 according to one or more embodiments is provided at an end portion of a multi-core fiber 10, and the multi-core fiber 10 is connected to other multi-core fibers or devices (not shown). For the sake of easy understanding, FIG. 1 shows the multi-core fiber 10 in a perspective view.

The multi-core fiber 10 includes a central core 11, an outer peripheral core 12 (outer peripheral cores 12*a* to 12*c*), and a cladding 13. An outer peripheral surface of the cladding 13 may be covered with a coating (not shown). The central core 11 may be a core formed in the center of the multi-core fiber 10 in parallel to a central axis of the multi-core fiber 10. The central core 11 forms an optical path linear with respect to a longitudinal direction of the multi-core fiber 10 in the center of the multi-core fiber 10.

The central core 11 may be formed of, for example, silica glass containing germanium (Ge). In addition, in the central core 11, fiber bragg grating (FBG) may be formed over the entire length thereof. A diameter of the central core 11 is set in a range of, for example, about 5 to 7 [μm].

The outer peripheral core 12 is a core formed to spirally surround the periphery of the central core 11. Specifically, the outer peripheral core 12 includes three outer peripheral cores 12*a* to 12*c* which are spaced apart from the central core 11 by a predetermined distance α (see FIG. 2B), and which are disposed at an interval of an angle β (for example, 120°) from each other in a cross section orthogonal to the longitudinal direction. The outer peripheral cores 12*a* to 12*c* extend in the longitudinal direction of the multi-core fiber 10 to spirally surround the periphery of the central core 11 while maintaining an interval of an angle β from each other. The three outer peripheral cores 12*a* to 12*c* form three spiral optical paths surrounding the central core 11 in the multi-core fiber 10.

The outer peripheral cores 12*a* to 12*c* may be formed of, for example, silica glass containing germanium (Ge), similarly to the central core 11. In addition, the outer peripheral cores 12*a* to 12*c* may have FBG formed over the entire length thereof. The outer peripheral cores 12*a* to 12*c* have the same diameter (or substantially the same diameter) as the central core 11 and are set in a range of, for example, about 5 to 7 [μm]. The outer peripheral cores 12*a* to 12*c* may have different diameters from the central core 11.

The distance α between the central core 11 and the outer peripheral cores 12*a* to 12*c* is selected in consideration of crosstalk between the cores, a difference in optical path length between the central core 11 and the outer peripheral cores 12*a* to 12*c*, and a difference in strain amount between the central core 11 and the outer peripheral cores 12*a* to 12*c* when the multi-core fiber 10 is bent. The distance α between the central core 11 and the outer peripheral cores 12*a* to 12*c* may be, for example, about 35 [μm]. The number of spirals of the outer peripheral cores 12*a* to 12*c* per unit length may be, for example, about 50 [turns/m]. In other words, the length of one period of the outer peripheral cores 12*a* to 12*c* (to be precise, the length of the multi-core fiber 10 in the longitudinal direction per one turn of the outer peripheral cores 12*a* to 12*c*: spiral period) is set to about 20 [mm].

The cladding 13 is a common cladding which covers the periphery of the central core 11 and the outer peripheral cores 12*a* to 12*c* and whose outer circumference shape is a cylindrical shape. Since the central core 11 and the outer peripheral cores 12*a* to 12*c* are covered with the common cladding 13, it can be said that the central core 11 and the outer peripheral cores 12*a* to 12*c* are formed inside the cladding 13. The cladding 13 may be formed of, for example, silica glass.

The optical connector 1 includes a ferrule 21 and a housing 22. The ferrule 21 is an annular column-shaped member in which fiber holes into which the multi-core fiber 10 is inserted are formed. The housing 22 is a substantially rectangular parallelepiped member that houses the ferrule 21. The housing 22 is also called a plug frame. The housing 22 is formed with a key 22*a* that is used for positional alignment with other multi-core fibers or the like while preventing erroneous connection to other multi-core fibers or the like to be connected. The positions of the outer peripheral cores 12*a* to 12*c* on the end surface of the multi-core fiber 10 are aligned with reference to the key 22*a* formed in the housing 22.

The ferrule 21 is fixed to the end portion of the multi-core fiber 10 such that one end side of the ferrule 21 is flush with (or substantially flush with) the end surface of the multi-core fiber 10 and is integrated with the multi-core fiber 10. The ferrule 21 is movable in a direction of the central axis of the multi-core fiber 10 but is housed in the housing 22 not to rotate around the central axis of the multi-core fiber 10. The ferrule 21 is housed in the housing 22 not to rotate around the central axis of the multi-core fiber 10. Therefore, the multi-core fiber 10, which is fixed to be integrated with the ferrule 21, does not rotate around the central axis of the multi-core fiber 10 as well.

Figure 2A:
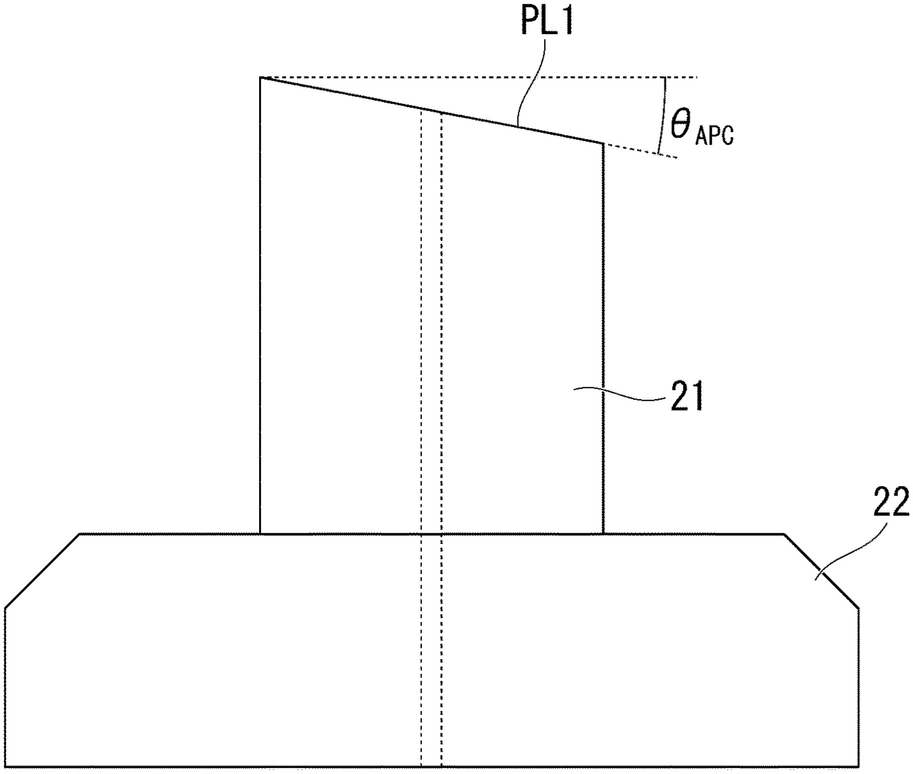
FIG. 2A is an enlarged view showing a tip portion of a ferrule included in the optical connector according to the first example.
Figure 2B:
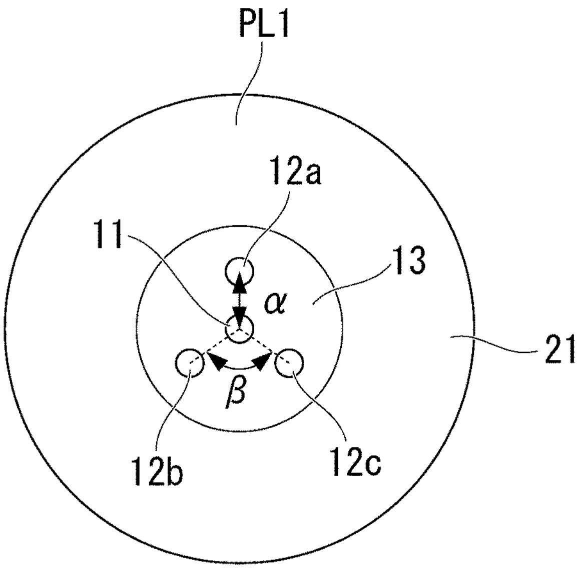
FIG. 2B is an enlarged view showing the tip portion of the ferrule included in the optical connector according to the first example.

FIGS. 2A and 2B are enlarged views showing a tip portion of the ferrule included in the optical connector according to the first example, in which FIG. 2A is a side view of the tip portion of the ferrule and FIG. 2B is a front view of the tip portion of the ferrule. As shown in FIG. 2A, the optical connector 1 of one or more embodiments is an angled physical contact (APC) connector in which the end surface of the ferrule 21, into which the multi-core fiber 10 is inserted, is obliquely polished by a predetermined angle $\theta_{APC}$. That is, the tip portion of the ferrule 21 is formed with an inclined surface PL1 forming the angle $\theta_{APC}$ with respect to the end surface perpendicular to the direction of the central axis of the multi-core fiber 10. It should be noted that $\theta_{APC}$ is, for example, 8°. The optical connector 1 is a so-called straight-type connector in which a diameter of the tip portion of the ferrule 21 is constant.

<Manufacturing Method for Optical Connector>

Figure 3:
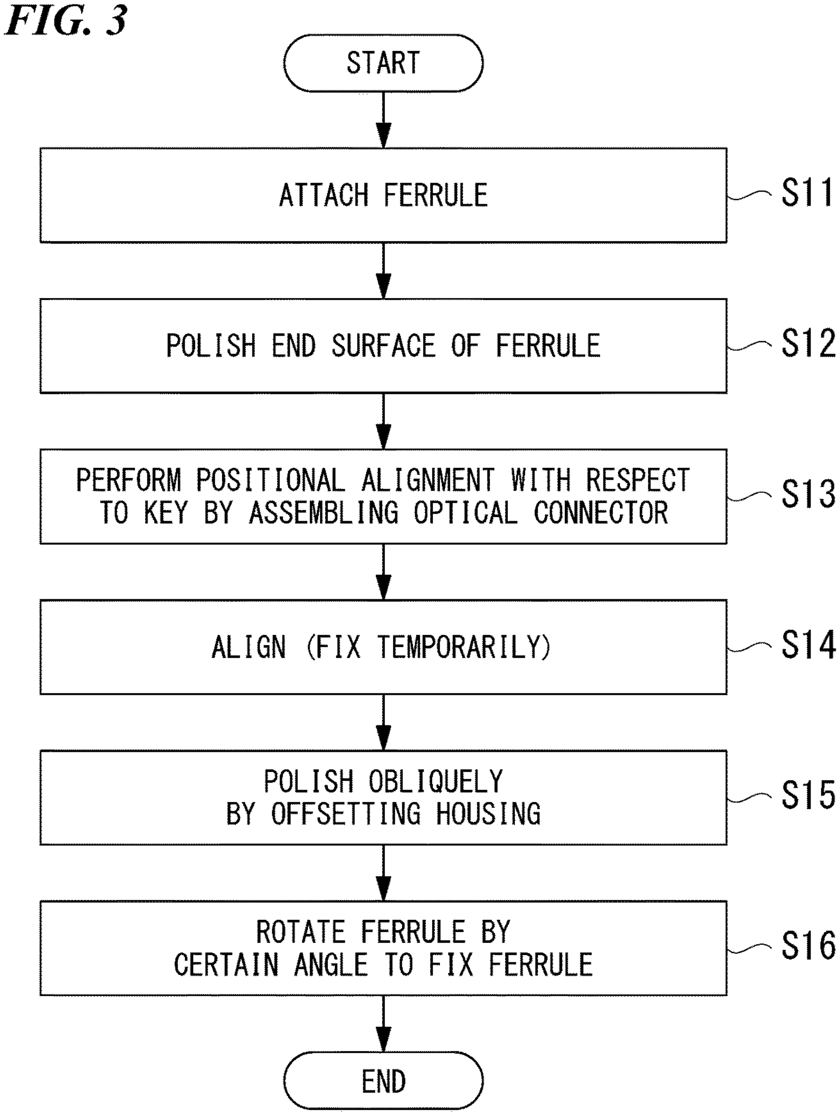
FIG. 3 is a flowchart showing a manufacturing method for an optical connector according to the first example.
Figure 4A:
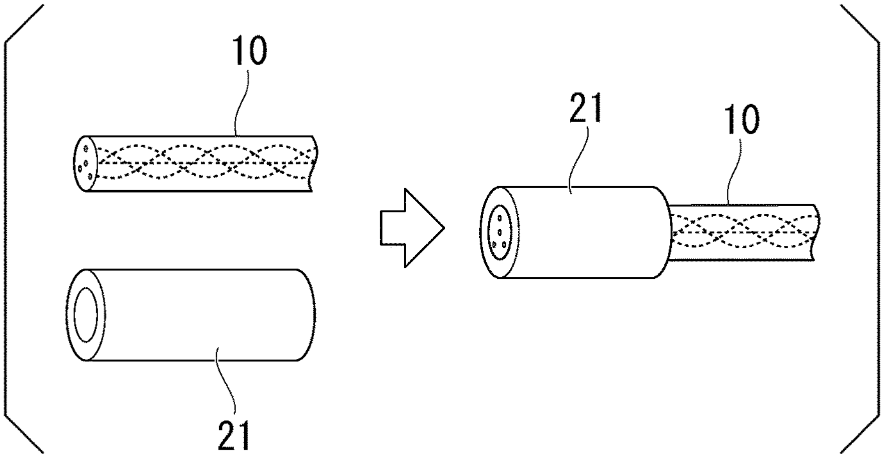
FIG. 4A is a view explaining the manufacturing method for an optical connector according to the first example.

FIG. 3 is a flowchart showing a manufacturing method for an optical connector according to the first example. In addition, FIGS. 4A to 7B are views explaining the manufacturing method for an optical connector according to the first example. As shown in FIG. 3, first, a step of attaching the multi-core fiber 10 to the ferrule 21 is performed (step S11: first step). Specifically, as shown in FIG. 4A, a step of fixing the ferrule 21 to the end portion of the multi-core fiber 10 by preparing the multi-core fiber 10 and the ferrule 21 is performed. For example, an adhesive is used to fix the ferrule 21 to the multi-core fiber 10.

Figure 4B:
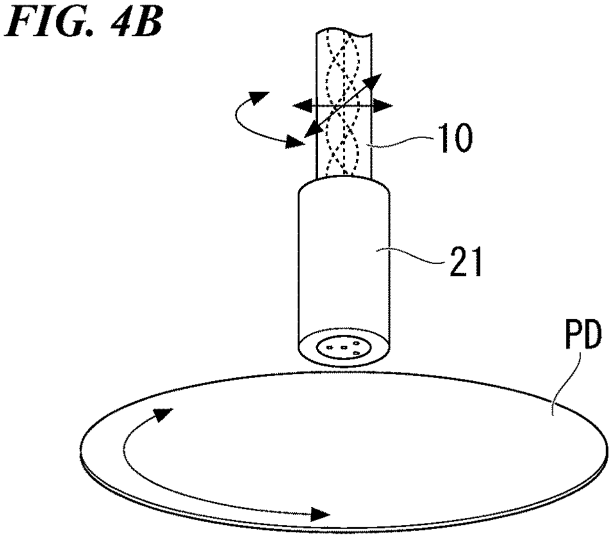
FIG. 4B is a view explaining the manufacturing method for an optical connector according to the first example.

Next, a step of polishing the end surface of the ferrule 21 fixed with the multi-core fiber 10 is performed (step S12: fifth step). Specifically, as shown in FIG. 4B, a step of polishing the end surface (one end side of the ferrule 21) of the multi-core fiber 10 by bringing the end surface of the multi-core fiber 10 into contact with the polishing surface is performed such that the central axis of the multi-core fiber 10 is perpendicular to the polishing surface of a polishing device PD. The polishing in this step is, for example, flat polishing. The step is performed so that a surface perpendicular to the direction of the central axis of the multi-core fiber 10 is formed in the ferrule 21. The end surface of the multi-core fiber 10 may be polished one by one, or a plurality of end surfaces of the multi-core fiber 10 may be polished at the same time. The plurality of end surfaces of the multi-core fiber 10 are polished at the same time, so that it is efficient because a time can be shortened.

Figure 4C:
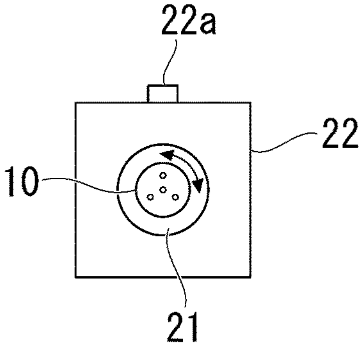
FIG. 4C is a view explaining the manufacturing method for an optical connector according to the first example.

Next, a step of aligning positions of the outer peripheral cores 12*a* to 12*c* with respect to the key 22*a* by assembling the optical connector 1 is performed (step S13: second step). Specifically, first, a step of assembling the optical connector 1 by housing the ferrule 21 to the housing 22 such that the ferrule 21 is rotatable around the central axis of the multi-core fiber 10. Then, as shown in FIG. 4C, a step of integrally rotating the multi-core fiber 10 and the ferrule 21 around the central axis of the multi-core fiber 10 to roughly align the positions of the outer peripheral cores 12*a* to 12*c* on the end surface of the multi-core fiber 10 with reference to the key 22*a* formed in the housing 22, is performed.

Figure 5A:
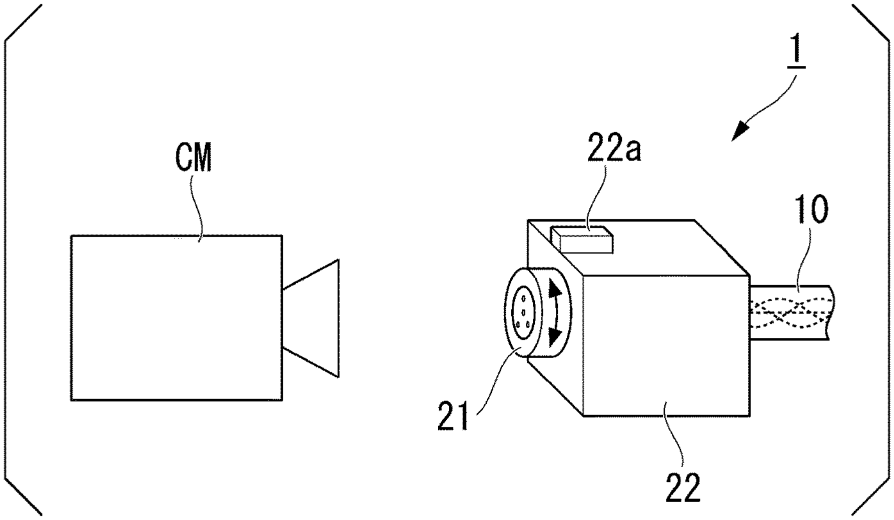
FIG. 5A is a view explaining the manufacturing method for an optical connector according to the first example.

Subsequently, a step of aligning the positions of the outer peripheral cores 12*a* to 12*c* on the end surface of the multi-core fiber 10 to temporarily fix the multi-core fiber 10 (ferrule 21) to the housing 22 is performed (step S14: second step). In the present specification, the term "temporarily fix" means simply fixing (for example, fixing with a jig) and fixing the multicore fiber 10 in order to prevent misalignment during polishing. For example, as shown in FIG. 5A, aligning is performed by rotating the multi-core fiber 10 together with the ferrule 21 using a camera CM or a microscope (not shown), while viewing images of the end surface of the multi-core fiber 10 and the key 22*a* of the housing 22, which are captured by the camera CM or the like.

Figure 5B:
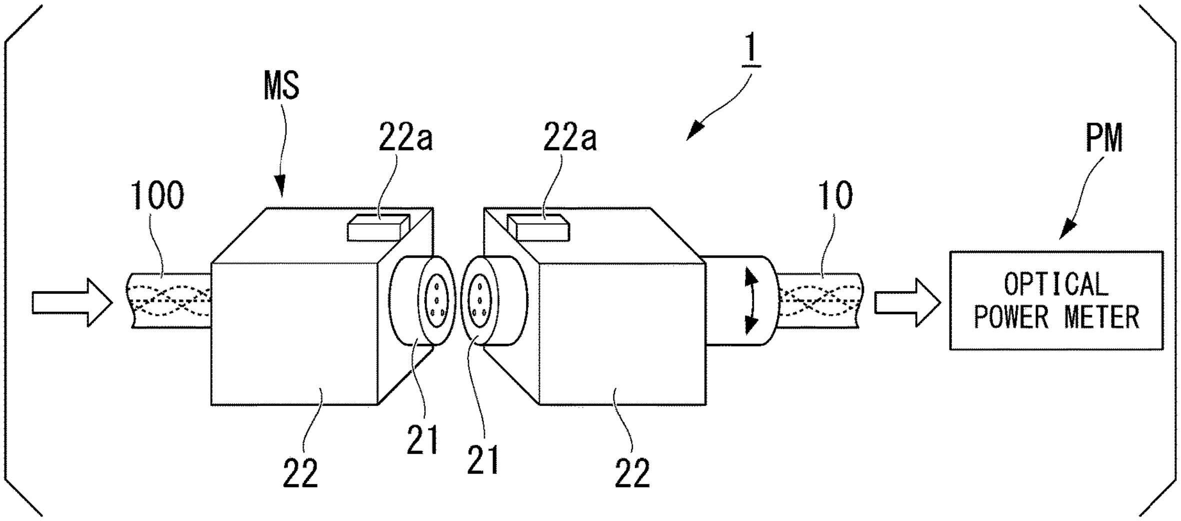
FIG. 5B is a view explaining the manufacturing method for an optical connector according to the first example.

Alternatively, as shown in FIG. 5B, a multi-core fiber 100, to which an optical connector MS serving as a master is attached, and an optical power meter PM are used for aligning. Specifically, the multi-core fiber 100 and the multi-core fiber 10 are connected by performing accurate positional alignment between the key 22*a* of the optical connector MS and the key 22*a* of the optical connector 1, using an adapter (not shown) or the like. Then, aligning is performed by monitoring power of light, which propagates from the multi-core fiber 100 to the multi-core fiber 10, with an optical power meter PM while rotating the multi-core fiber 10 together with the ferrule 21.

In the aligning method shown in FIG. 5B, the total power of light, which propagates through each core, may be monitored using one optical power meter PM, or power of light, which propagates through each core, may be individually monitored using a plurality of optical power meters PM. Alternatively, an optical switch may be used to switch cores through which light is propagated, and the power of light propagating through each core may be sequentially monitored. The cores through which light is propagated may be limited to specific one or two cores, and only the power of light propagating through these limited cores may be monitored.

Figure 6:
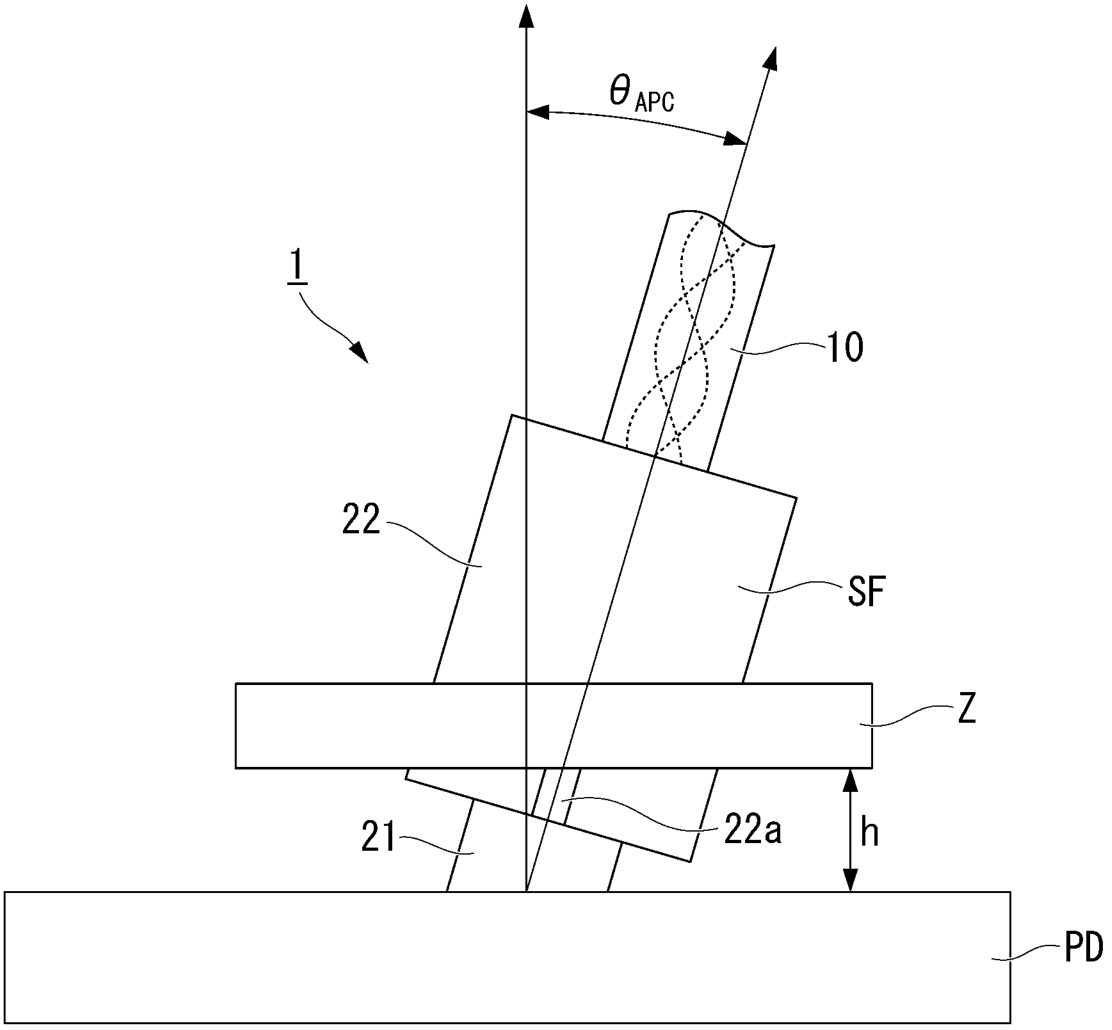
FIG. 6 is a view explaining the manufacturing method for an optical connector according to the first example.

Subsequently, a step of obliquely polishing the end surface of the ferrule 21 by offsetting the housing 22 is performed (step S15: third step). Specifically, as shown in FIG. 6, the optical connector 1 is attached to the jig Z such that the central axis of the multi-core fiber 10 is inclined. In this case, the optical connector 1 is attached to the jig Z such that the central axis of the multi-core fiber 10 forms a predetermined angle $\theta_{APC}$ (for example, 8°) with respect to a perpendicular line of the polishing surface of the polishing device PD.

Figure 7A:
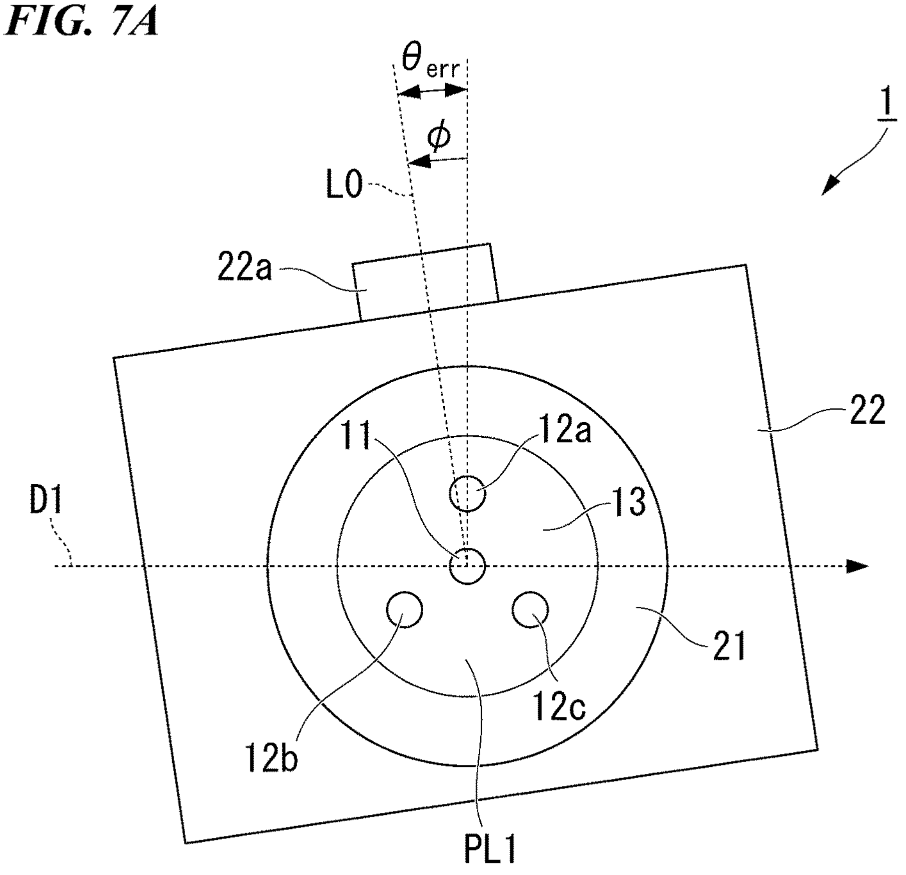
FIG. 7A is a view explaining the manufacturing method for an optical connector according to the first example.

Further, as shown in FIG. 7A, the orientation of the optical connector 1 is set such that the housing 22 is rotated around the central axis of the multi-core fiber 10 by a rotational offset amount φ. Specifically, the orientation of the optical connector 1 is set such that an angle, which is formed between one surface SF (see FIG. 6) of the housing 22 in which the key 22*a* is formed and a surface including the central axis of the multi-core fiber 10 and the perpendicular line of the polishing surface of the polishing device PD, is the rotational offset amount φ.

In this case, the rotational offset amount p is an amount that can compensate for the positional misalignment of the outer peripheral cores 12*a* to 12*c*, which is expected due to the oblique polishing of the ferrule 21. Then, a step of polishing, by a predefined amount, the end surface of the ferrule 21 (multi-core fiber 10) by bringing the ferrule 21 (multi-core fiber 10) into contact with the polishing surface of the polishing device PD, is performed.

Finally, a step of fixing the ferrule 21 to the housing 22 is performed after rotating the ferrule 21 around the central axis of the multi-core fiber 10 by a certain angle (step S16: fourth step). The certain angle is an angle that can minimize the positional misalignment of the outer peripheral cores 12*a* to 12*c* caused by the oblique polishing of the ferrule 21 performed in step S15. The angle is obtained in advance from the polished amount of the end surface of the ferrule 21, the angle $\theta_{APC}$ of the inclined surface PL1, and structural parameters (the distance α between the central core 11 and the outer peripheral core 12 and the spiral period and the like) of the multi-core fiber 10.

Figure 7B:
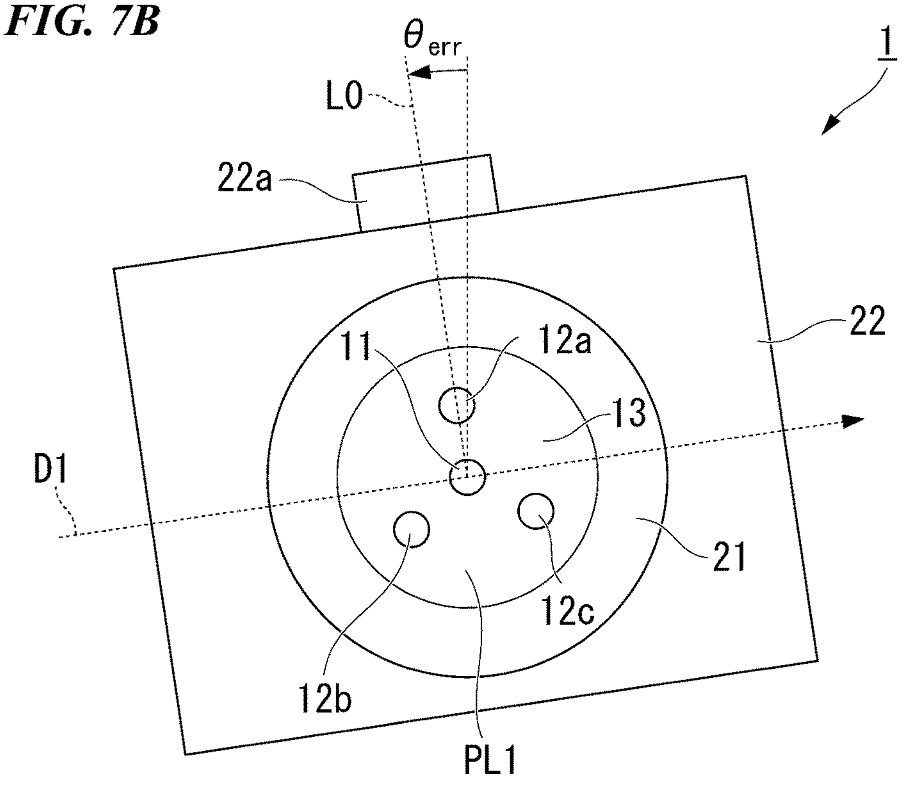
FIG. 7B is a view explaining the manufacturing method for an optical connector according to the first example.

For example, it is assumed that an angle of the positional misalignment of the outer peripheral cores 12*a* to 12*c* with respect to the key 22*a*, which is caused by the oblique polishing of the ferrule 21, is defined as $\theta_{err}$, as shown in FIG. 7A. Then, in step S16, as shown in FIG. 7B, a step of fixing the ferrule 21 to the housing 22 by rotating the ferrule 21 and the multi-core fiber 10 counterclockwise by the angle $\theta_{err}$ is performed. The optical connector 1 is manufactured by the above steps.

In this case, in one or more embodiments, the ferrule 21 is obliquely polished in a state where the housing 22 is offset. Therefore, as shown in FIG. 7A, when the ferrule 21 is obliquely polished (when step S15 ends), an inclination direction D1 of the inclined surface PL1 is not perpendicular to a straight line L0 passing through the central core 11 and the key 22*a*. In step S16, when the ferrule 21 and the multi-core fiber 10 are rotated counterclockwise by the angle $\theta_{err}$, the inclination direction D1 of the inclined surface PL1 is perpendicular to the straight line L0 passing through the central core 11 and the key 22*a* as shown in FIG. 7B. That is, in the optical connector 1 manufactured in one or more embodiments, no positional misalignment of the outer peripheral cores 12*a* to 12*c* occurs with respect to the key 22*a*, and the angle of the inclined surface PL1 with respect to the key 22*a* is aligned.

The ferrule 21 is movable in a direction of the central axis of the multi-core fiber 10, but is fixed to the housing 22 not to rotate around the central axis of the multi-core fiber 10. The multi-core fiber 10 is fixed to be integrated with the ferrule 21. Therefore, the multi-core fiber 10 is also movable in the direction of the central axis of the multi-core fiber 10, but is not rotated around the central axis of the multi-core fiber 10.

As described above, in one or more embodiments, first, the multi-core fiber 10, in which the central core 11 and the spiral outer peripheral core 12 are formed, is inserted into and fixed to the ferrule 21. Next, the ferrule 21 is inserted into the housing 22 to align the position of the outer peripheral core 12 around the central axis of the multi-core fiber 10. Next, the ferrule 21 is obliquely polished in a state where the housing 22 is rotated around the central axis of the multi-core fiber 10 by the rotational offset amount p. Then, the ferrule 21 is fixed to the housing 22 after rotating the ferrule 21 around the central axis of the multi-core fiber 10 by a certain angle. Accordingly, the position of the outer peripheral core 12 with respect to the key 22*a* and the angle of the inclined surface PL1 with respect to the key 22*a* can be aligned, so that the connection loss can be reduced as compared with the related art.

Second Example

<Optical Connector>

The optical connector 2 according to one or more embodiments has the same configuration as the optical connector 1 shown in FIG. 1. Therefore, the detailed description of the optical connector 2 will be omitted.

<Manufacturing Method for Optical Connector>

Figure 8:
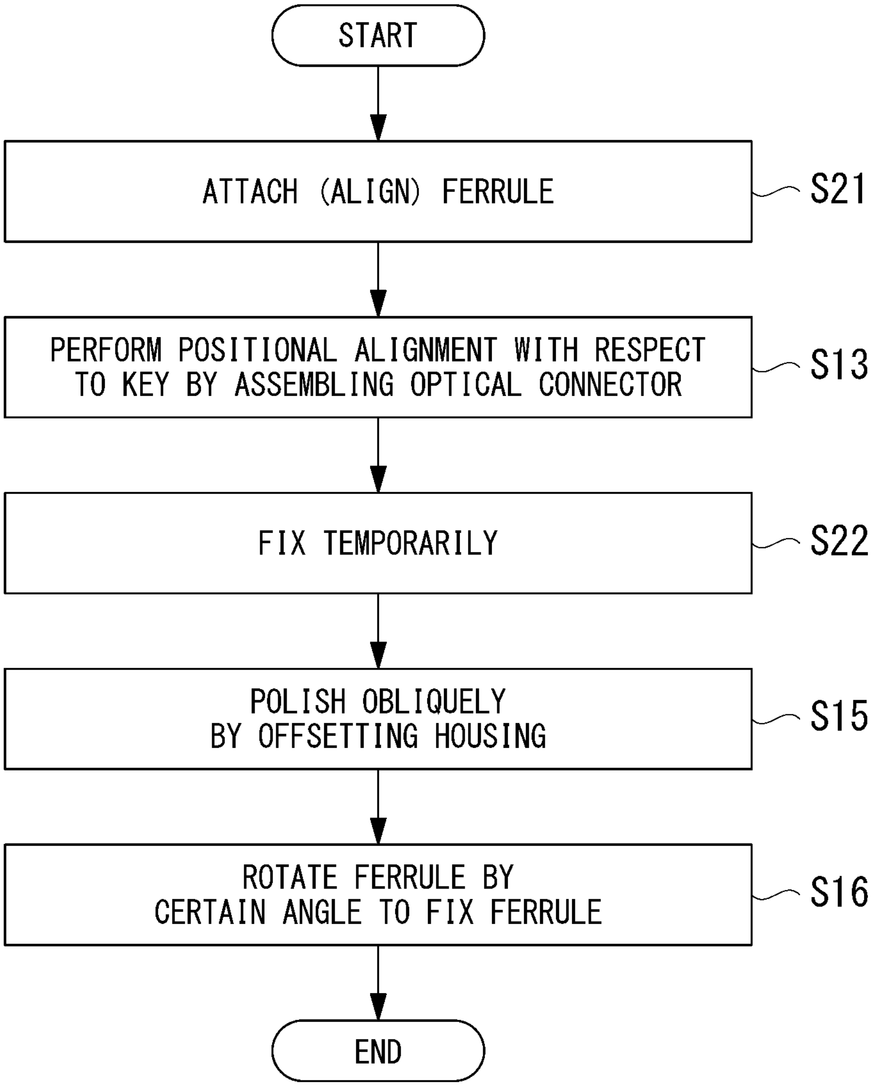
FIG. 8 is a flowchart showing a manufacturing method for an optical connector according to a second example.

FIG. 8 is a flowchart showing a manufacturing method for an optical connector according to a second example. In FIG. 8, the same reference numerals are given to the same steps as those shown in FIG. 3. In the flowchart shown in FIG. 8, steps S11 and S14 of the flowchart shown in FIG. 3 are replaced with steps S21 and S22, and step S12 is omitted.

In one or more embodiments, first, a step of aligning the multi-core fiber 10 by attaching the multi-core fiber 10, which has a polished end surface, to the ferrule 21 such that the end surface of the multi-core fiber 10 is flush with the end surface of the ferrule 21, is performed (step S21: first step). Specifically, a step, in which the multi-core fiber 10 is inserted into the ferrule 21, the multi-core fiber 10 is aligned with respect to the ferrule 21, and then the ferrule 21 is fixed to the end portion of the multi-core fiber 10, is performed. For example, an adhesive is used to fix the ferrule 21 to the multi-core fiber 10.

Next, as in the first example, a step of aligning positions of the outer peripheral cores 12*a* to 12*c* with respect to the key 22*a* by assembling the optical connector 2 is performed (step S13). Then, a step of temporarily fixing the multi-core fiber 10 (ferrule 21) to the housing 22 is performed (step S22).

Subsequently, a step of obliquely polishing the end surface of the ferrule 21 by offsetting the housing 22 is performed (step S15). Finally, a step of fixing the ferrule 21 to the housing 22 is performed after rotating the ferrule 21 around the central axis of the multi-core fiber 10 by a certain angle (step S16). The optical connector 2 is manufactured by the above steps.

The ferrule 21 is movable in a direction of the central axis of the multi-core fiber 10 but is fixed to the housing 22 not to rotate around the central axis of the multi-core fiber 10. Since the multi-core fiber 10 is fixed to be integrated with the ferrule 21, the multi-core fiber 10 is also movable in the direction of the central axis of the multi-core fiber 10, but is not rotated around the central axis of the multi-core fiber 10.

As described above, in one or more embodiments, first, the multi-core fiber 10, in which the central core 11 and the spiral outer peripheral core 12 are formed, is inserted into the ferrule 21, and then fixed to the ferrule 21 after the multi-core fiber 10 is aligned. Next, the ferrule 21 is inserted into the housing 22 to align the position of the outer peripheral core 12 around the central axis of the multi-core fiber 10. Next, the ferrule 21 is obliquely polished in a state where the housing 22 is rotated around the central axis of the multi-core fiber 10 by the rotational offset amount p. Then, the ferrule 21 is fixed to the housing 22 after rotating the ferrule 21 around the central axis of the multi-core fiber 10 by a certain angle. Accordingly, the position of the outer peripheral core 12 with respect to the key 22*a* and the angle of the inclined surface PL1 with respect to the key 22*a* can be aligned, so that the connection loss can be reduced as compared with the related art.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims. For example, although the optical connectors 1 and 2 in the above-described embodiments are so-called straight-type connectors, the optical connector may be a so-called conical-type connector in which the tip portion of the ferrule 21 has a conical shape.

Figure 9:
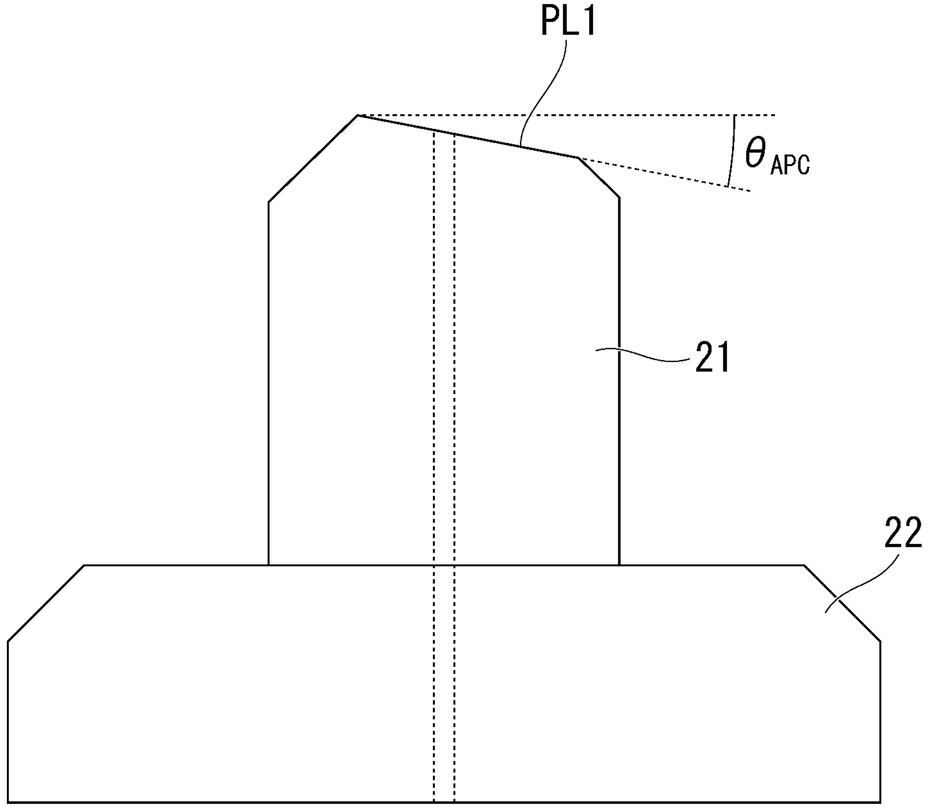
FIG. 9 is an enlarged view showing a tip portion of a ferrule included in a so-called conical-type optical connector.

FIG. 9 is an enlarged view showing a tip portion of a ferrule included in a so-called conical-type optical connector. In the so-called conical-type optical connector, the tip portion of the ferrule 21 has a conical shape, and the end surface of the ferrule 21 is flat. As shown in FIG. 9, when the flat end surface is obliquely polished, as in the above-described embodiments, the optical connector can be manufactured with reduced connection loss over the related art.

However, step S16 in the first and second examples may be replaced with a step of fixing the ferrule 21 to the housing 22 after the positions of the outer peripheral cores 12*a* to 12*c* are aligned on the end surface of the multi-core fiber 10. Therefore, the positions of the outer peripheral cores 12*a* to 12*c* with respect to the key 22*a* can be aligned more accurately.

Further, in the first and second examples, the ferrule 21 is obliquely polished by a predefined amount (step S15). However, the ferrule 21 may be obliquely polished such that the width l of the reference surface PL0 (see FIGS. 10A and 10B), which is the end surface perpendicular to the direction of the central axis of the multi-core fiber 10, is the predefined width.

Figure 10A:
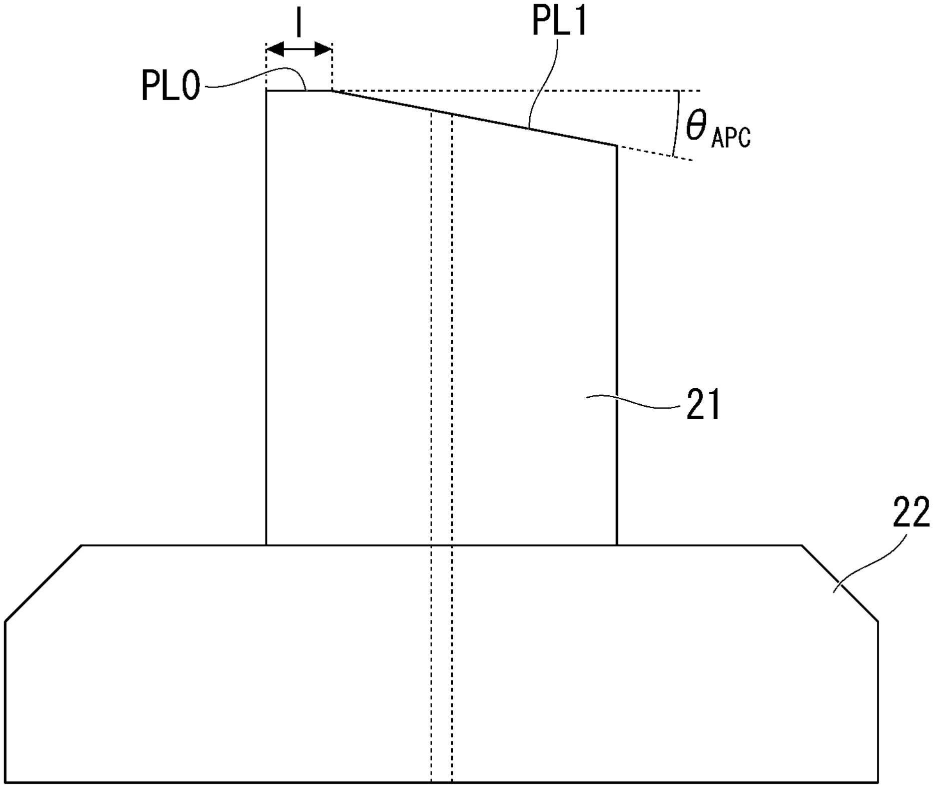
FIG. 10A is an enlarged view showing a tip portion of a ferrule included in the optical connector according to a modification example.
Figure 10B:
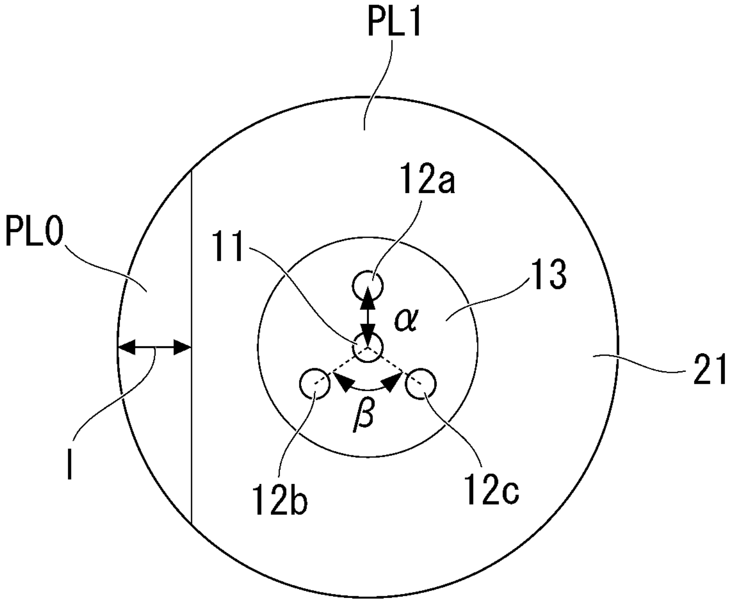
FIG. 10B is an enlarged view showing the tip portion of the ferrule included in the optical connector according to the modification example.

FIGS. 10A and 10B are enlarged views showing the tip portion of the ferrule included in the optical connector according to the modification example. As shown in FIGS. 10A and 10B, the tip portion of the ferrule 21 is formed with a reference surface PL0, which is an end surface perpendicular to the direction of the central axis of the multi-core fiber 10 and an inclined surface PL1 forming the angle $\theta_{APC}$ with respect to the reference surface PL0. The inclined surface PL1 is formed such that a width l of the reference surface PL0 is the predefined width. This is because the connection loss can be reduced over the related art by suppressing variation of the polished amount when the ferrule 21 is obliquely polished to form the inclined surface PL1.

In this case, the reference surface PL0 has a substantially "D" shape as shown in FIG. 10B. That is, the reference surface PL0 has a shape including a straight line (an intersection line between the reference surface PL0 and the inclined surface PL1) and a curved line (an outer edge of the ferrule 21). The width l of the reference surface PL0 is an arrow height (height of the arc) when the straight line is regarded as a chord and the curved line is regarded as an arc.

When a spiral period of the multi-core fiber 10 is defined as fw, a diameter of the reference surface PL0 (diameter before oblique polishing) is defined as d, a width of the reference surface PL0 is defined as l, and an angle of oblique polishing of the ferrule 21 is defined as $\theta_{APC}$, the rotational offset amount φ of the housing 22 in the step of obliquely polishing the ferrule 21 (step S15) is expressed by the following Equation (1).

Equation 1

$$\varphi = \frac{2\pi}{fw} \times \left(\frac{d}{2} - l\right) \times \tan\theta_{APC} \tag{1}$$

The oblique polishing of the ferrule 21 is performed such that the width l of the reference surface PL0 of the ferrule 21 (surface formed in step S12 and step S21) (see FIGS. 10A and 10B) is the predefined width. For example, as shown in FIG. 6, the polished amount of the ferrule 21 is adjusted such that the width l of the reference surface PL0 is the predefined width while referring to a height position h of the jig Z with respect to the polishing surface of the polishing device PD and a polishing time.

The ferrule 21 is obliquely polished such that the width l of the reference surface PL0 of the ferrule 21 is the predefined width, so that it is possible to accurately grasp the polished amount. As a result, since variations when the ferrule 21 is obliquely polished can be suppressed, the connection loss can be reduced over the related art. Also, in the so-called conical-type optical connector shown in FIG. 9, the ferrule 21 may be obliquely polished such that the width l of the reference surface PL0 of the ferrule 21 is the predefined width.

Further, although the multi-core fiber 10 described in the above-described embodiments includes a linear central core 11 and three spiral outer peripheral cores 12*a* to 12*c*, the multi-core fiber can have at least one of the plurality of cores, which is spirally formed. Further, in the multi-core fiber, the central core 11 may be omitted.

Further, when FBG is formed in the central core 11 and the outer peripheral cores 12*a* to 12*c* of the multi-core fiber 10, the FBG may be formed over the entire length of the multi-core fiber 10 in the longitudinal direction or may be formed on only a partial region of the multi-core fiber 10 in the longitudinal direction. In addition, the FBG, which is formed in the central core 11 and the outer peripheral cores 12*a* to 12*c* of the multi-core fiber 10, may be FBG having a certain period or may be FBG (chirped grating) having a continuously changing period.

REFERENCE SIGNS LIST

1, 2: Optical connector
10: Multi-core fiber
12: Outer peripheral core
21: Ferrule
22: Housing
PL0: Reference surface

The invention claimed is:

1. A manufacturing method for an optical connector, comprising:

inserting and fixing a multi-core fiber into a ferrule, wherein at least one of a plurality of cores of the multi-core fiber is a spiral core;

inserting the ferrule into a housing and aligning the cores with the housing around a central axis of the multi-core fiber;

obliquely polishing the ferrule while the housing rotates with respect to the central axis to have a rotational offset amount that compensates for positional misalignment of the cores expected due to the oblique polishing of the ferrule;

fixing the ferrule to the housing after the aligning of the cores; and after inserting and fixing the multi-core fiber but before inserting the ferrule and aligning the cores, polishing the ferrule perpendicularly to a direction of the central axis.

2. The manufacturing method according to claim 1, wherein the fixing of the ferrule includes aligning the cores by rotating the ferrule around the central axis.

3. The manufacturing method according to claim 1, wherein the fixing of the ferrule includes aligning positions of the cores on an end surface of the multi-core fiber by rotating the multi-core fiber together with the ferrule.

4. The manufacturing method according to claim 1, wherein the fixing the multi-core fiber includes fixing the multi-core fiber to the ferrule such that, in a state where positions of the cores around the central axis having a polished end surface are aligned with respect to the ferrule, the polished end surface is flush with an end surface of the ferrule.

5. A manufacturing method for an optical connector, comprising:

inserting and fixing a multi-core fiber into a ferrule, wherein at least one of a plurality of cores of the multi-core fiber is a spiral core;

inserting the ferrule into a housing and aligning the cores with the housing around a central axis of the multi-core fiber;

obliquely polishing the ferrule while the housing rotates with respect to the central axis to have a rotational offset amount that compensates for positional misalignment of the cores expected due to the oblique polishing of the ferrule; and fixing the ferrule to the housing after the aligning of the cores, wherein the oblique polishing of the ferrule includes obliquely polishing the ferrule until an end surface of the ferrule has:

a perpendicular portion perpendicular to a direction of the central axis and having a predefined width; and an inclined portion inclined with respect to the perpendicular portion.

6. The manufacturing method according to claim 5, wherein the rotational offset amount is expressed by $$\varphi = \frac{2\pi}{fw} \times \left(\frac{d}{2} - l\right) \times \tan\theta_{APC}$$

where $\varphi$ is the rotational offset amount, fw is a spiral period of the multi-core fiber, d is a diameter of the end surface of the ferrule before obliquely polishing the ferrule, l is the predefined width of the perpendicular portion of the end surface of the ferrule, and $\theta_{APC}$ is an inclination angle of the inclined portion with respect to the perpendicular portion.

* * * * *